(12) United States Patent
Abrams et al.

(10) Patent No.: US 6,285,367 B1
(45) Date of Patent: Sep. 4, 2001

(54) METHOD AND APPARATUS FOR DISPLAYING AND NAVIGATING A GRAPH

(75) Inventors: Steven R. Abrams, New City; Daniel V. Oppenheim, Croton-on-Hudson; Donald P. Pazel, Montrose; James L. Wright, Chappaqua, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/084,060

(22) Filed: May 26, 1998

(51) Int. Cl.$^7$ .............................. G06F 3/00; G06F 13/00
(52) U.S. Cl. .......................... 345/357; 345/356; 345/353
(58) Field of Search ..................... 345/440, 133, 345/353, 356, 357, 118, 332, 340, 342, 343, 346, 352, 354

(56) References Cited

U.S. PATENT DOCUMENTS

| | | | |
|---|---|---|---|
| 4,821,211 | * | 4/1989 | Torres ................................. 364/521 |
| 5,450,535 | * | 9/1995 | North .................................. 395/140 |
| 5,596,699 | * | 1/1997 | Driskell ............................... 345/352 |
| 5,701,424 | * | 12/1997 | Atkinson ............................. 345/353 |
| 5,798,760 | * | 8/1998 | Vayda et al. ........................ 345/352 |
| 5,801,680 | * | 9/1998 | Minakuchi ........................... 345/150 |
| 5,905,494 | * | 5/1999 | Krosner et al. ..................... 345/335 |
| 5,917,487 | * | 6/1999 | Ulrich ................................. 345/340 |
| 5,926,178 | * | 7/1999 | Kurtenbach ......................... 345/352 |
| 5,926,180 | * | 7/1999 | Shimamura ......................... 345/357 |
| 5,940,083 | * | 8/1999 | Broekhuijsen ...................... 345/442 |
| 5,943,039 | * | 8/1999 | Anderson et al. ................... 345/146 |
| 5,999,895 | * | 12/1999 | Forest .................................... 704/1 |
| 6,044,361 | * | 3/2000 | Kalagnanam et al. ............... 705/28 |

* cited by examiner

*Primary Examiner*—Richard Hjerpe
*Assistant Examiner*—Kevin M. Nguyen
(74) *Attorney, Agent, or Firm*—McGuireWoods, LLP; Stephen C. Kaufman

(57) ABSTRACT

Data is graphically displayed using a set of successive outer sectors of a geometrical shape, such as nested concentric circles, in order to provide easy navigation through related data items. Successive outer portions may be partitioned into sectors and are related to the adjacent inner more sector of the graphical representation. The outer sectors may be dynamic or static in nature. When a user selects an outer sector, that outer sector appropriately regenerates to become the new focus (or center) of the graphical representation and successive outer sectors related to the new focus are generated in order to easily navigate through the nodes of the present invention. If the outer sectors were already displayed, those outer sectors become redisplayed to inner more sectors. The non selected nodes of the same level of the selected node and those nodes related to the non selected nodes are no longer graphically represented when the new outer sectors are generated and previous outer sectors are redisplayed to new inner sectors.

29 Claims, 6 Drawing Sheets

METHOD AND APPARATUS FOR DISPLAYING AND NAVIGATING A GRAPH

BACKGROUND OF THE INVENTION

1. Field of the Invention

The present invention generally relates to a method and apparatus for navigating a graph of data items in a data processing system utilizing a visual display and, more particularly, to a method and apparatus for navigating a graph of data items where the data items are displayed in successive outer portions of a geometric shape, such as successive circular shaped portions, the center portion showing a current position and successive outer portions showing optional paths for navigation.

2. Background Description

Information may be graphically displayed on computer screens or other means of visual display in many different manners. These graphical displays include simple tree diagrams to menu driven displays similar to those currently used in many programs, such as Lotus WordPro®.

Typically, graphically based information often consists of a set of related data items referred to as "nodes". The nodes are related to one another through another type of data item called "arcs". The arcs connect the nodes to one another and may define the relationship between the nodes. In the case when two nodes are connected by an arc, the nodes are referred to as "neighbors". In most graphical cases, the arcs are depicted as lines having arrows pointing in a predefined direction to a node. In this case, when the arcs connect two nodes that have a special relationship to one another, the arcs are then often referred to as "directed" arcs.

The nodes may be related to one another (via arcs) such that one node may bring the user to a second and related node. For example, a family tree may include several generations, for example, a parent (e.g., a first node) and a child (e.g., a second node). Between the parent and the child nodes is an arc that defines the relationship between the parent and the child (i.e., the child is a direct descendant of the parent). In the above example, the arc may have an arrow pointing from the most recent generation (e.g., child) to the next preceding generation (e.g., parent). By proceeding through several nodes, the user ultimately attains the required information, such as the name of a great grandfather.

By way of further example, the arcs may also depict a qualitative measure, in addition to depicting the relationship between adjacent nodes. In other words, nodes of a graph may represent the parts of some physical assemblage, and the arcs connecting the nodes may represent qualitative information about the relationships between the nodes. For example, a graph may be drawn where each node represents a city. Arcs may then connect the cities, where the arcs represent both roads between adjacent cities (e.g., relationship), while at the same time referring to data holding distances between the adjacent cities (e.g., qualitative measure).

However, representing graphs on a visual display, such as a computer screen, has posed many problems that have been difficult to overcome. As previously described, graphs are usually displayed in a fairly conventional manner using small circles to represent nodes, and lines to represent arcs. The problem with this representation is that it does not scale well to display technology, and even a modest size graph would overwhelm a user in its amount of data.

Also, many graphs do not lend themselves to a "natural" layout, due to the nature of the information being graphically displayed. For example, a graph of a local telephone network would consist of thousands and maybe millions of arcs and nodes. This would lead to a very complex graphical representation of data items that would be almost impossible to decipher by a user searching such information. In these instances, automating a graph layout is typically difficult and to some degree unpredictable except for the imposition of general constraints (e.g., minimizing the number of arc crossings). However, even some complex graphical representations, such as the above example of the local telephone network, would still provide practically no useful graphical information after automation.

In addition to the above mentioned shortcomings of present graphical representations, there are many instances a user desires to not only interact with an entire graph, but at times to equally interact with only a small portion of the graphical information. In the latter scenario the user is typically concerned with interacting only with a certain locale of the graph in order to glean certain specific information.

In the case where only a small locale of the graph is desired (e.g., immediate neighbors), many graphical systems utilize zooming control. However, zoom control does not work uniformly in that it is easy to zoom to locales with neighbors that cannot easily be rendered with the focus of the locale. This all depends on the graph layout itself which by virtue of its computational complexity cannot easily address locality constraints across the entire graph.

SUMMARY OF THE INVENTION

It is therefore an object of the present invention to provide a method and apparatus for navigating a graph of data items in a data processing system utilizing a visual display.

It is a further object of the present invention to provide a method and apparatus for navigating a graph of data items where the data items are displayed in successive geometric shapes partitioned into sectors, the center portion being a current position and successive outer sectors being related data items to the center portion.

It is still a further object of the present invention to provide a method and apparatus for navigating a graph of data items where the data items are displayed in concentric circular portion, the center portion being a current position and successive outer portions being related data items to the center portion.

It is another object of the present invention to provide a method and apparatus for navigating a graph of data items where the graphical display allows easy access to all nodes of the graph.

It is still another object of the present invention to provide a method and apparatus for navigating a graph of data items where nodes are automatically generated and/or reassigned when an inner node is selected.

According to the invention, there is provided a method and apparatus for navigating a graph of data in a data processing system. In preferred embodiments, a number of different types of data items may be graphically represented as nodes, such as audio data, visual data, numerical data and the like.

In preferred embodiments, data is graphically displayed using a set of successive outer portions of a geometrical shape, such as successive concentric circles, in order to provide easy navigation through related data items. The inner most portion is referred to as the "focus" and is identified with some node or data item. Successive outer portions may be partitioned into sectors and are related to the inner node or focus. Still further outer consecutive portions may be partitioned into sectors and relate to an adjacent inner portion or sector. Thus, several outer portions partitioned into sectors are contemplated for use by the present invention.

In preferred embodiments, when a user selects an outer sector, that outer sector appropriately regenerates to become the new focus (or center) of the graph and successive outer sectors related to the new focus are generated in order to easily navigate through the nodes of the present invention. If the outer sectors were already displayed, those outer sectors become redisplayed to inner more sectors. It is further understood that once the new focus is generated and the outer sectors are redisplayed or are further generated, the system of the present invention re-identifies the nodes of the new focus and outer sectors so that at all times adjacent inner and outer sectors are related.

Further, the non selected nodes of the same level of the selected node and those nodes related to the non selected nodes are no longer graphically represented when the new outer sectors are generated and previous outer sectors are redisplayed to new inner sectors related to the selected node. Thus, further navigation within the graph of the present invention can be accomplished after the user selects a particular sector on the graph.

A data processing system for executing the method of the present invention is also provided.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
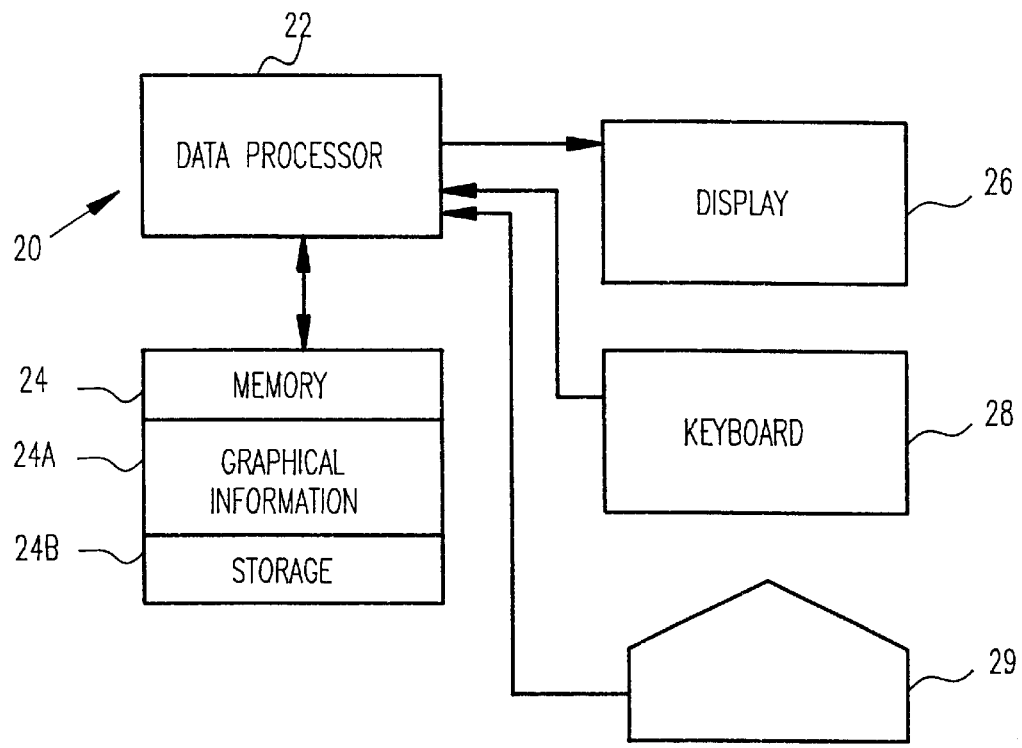
FIG. 1 is a block diagram of a data processing system for navigating a graph of data items of the present invention.

The present invention relates to a method and apparatus for navigating a graph of data in a data processing system.

In preferred embodiments, a number of different types of data may be graphically represented as nodes, such as, for example, audio data, visual data, numerical data and the like.

In general, preferred embodiments of the present invention graphically display data using a set of nested successive concentric circle portions in order to provide easy navigation through the graph. The inner portion of the concentric circle and all successive outer concentric circle portions represent data items or nodes associated by arcs.

However, in embodiments, other geometric shapes, such as trapezoids, triangles, and the like are contemplated for use by the present invention. Accordingly, the method and apparatus of the present invention is not limited to any one geometric shape in order to provide easy navigation through the graph. The only limitation of the method and apparatus of the present invention is that outer portions which may be partitioned into sectors, are related to a corresponding inner portion (e.g., neighbor), which may or may not be partitioned into sectors.

In preferred embodiments, an inner most portion is referred to as the "focus" and is identified with some node or data item graphically represented by some indicia, such as, for example, letter, numbers, alphanumericals, images or audio. In preferred embodiments, nested successive outer portions are partitioned into sectors and identified (e.g., related) to the inner node or focus. However, in embodiments, the successive outer portions need not be partitioned into related sectors in order for the method and apparatus of the present invention to work in its intended manner, so long as the inner and outer portions are related. The related adjacent inner and outer portions and/or sectors are referred to as "neighbors".

In embodiments, the data items displayed by the method and apparatus of the present invention may be dynamic (e.g, changing over time) or static. Accordingly, the present invention permits the user to select an inner sector, while at the same time generating further successive outer portions that may be partitioned into sectors related to the selected inner sector. Thus, the method and apparatus of the present invention automatically provides successive outer layers so as to provide easy navigation for the user between related data items.

In other words, and in preferred embodiments, when the user selects a sector, that sector appropriately regenerates to become the focus (or center) of the graph and successive outer portions partitioned into sectors related to the new focus are generated in order to easily navigate through the nodes of the present invention. If the outer sectors were already displayed, those outer sectors become redisplayed to inner more sectors. It is further understood that once the new focus is generated and the outer sectors are redisplayed or are further generated, the system of the present invention re-identifies the nodes of the new focus and related outer sectors so that the adjacent inner and outer sectors are related.

Further, the sectors of the same level of the selected sector and those sectors related to the non selected sectors are no longer graphically represented by the method and apparatus of the present invention when the new focus and outer sectors are redisplayed or generated. Thus, only those data items that are related to the selected sector (e.g., data item) are nested in order to provide further navigation.

Referring now to the drawings, and more particularly to FIG. 1, there is shown a block diagram of a data processing system for navigating a graph of data items of the present invention, as described above. In preferred embodiments, the data processing system 20 is an IBM Aptiva computer (IBM and Aptiva are both registered trademarks of the International Business Machines Corporation). However, other data processing systems 20 are also contemplated for use by the present invention. For example, the invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention.

Referring again to FIG. 1, the data processing system 20 of the present invention comprises a data processor 22 having a memory 24. The memory 24 is coupled to the data processor 22 via a bidirectional bus. In preferred embodiments, the memory 24 includes program and data memory. The memory also includes graph information 24*a* and storage 24*b* for presentation space.

The graph information 24*a* (e.g., data items represented as nodes) is displayed on the display 26 which is coupled to the data processor 22. In embodiments, a user data entry device 28, (e.g., keyboard or other interactive device) and a pointing device 29, for example, a mouse or a trackball, are also coupled to the data processor 22. Both the user data entry device 28 and the pointing device 29 are not essential for practicing the method of the present invention.

In preferred embodiments, the display 26 provides a presentation space in order to display the data items of the present invention. In further embodiments, either the pointing device 29 or predefined keys of the data entry device 28 may be used to manipulate the data in conformity with the present invention.

In preferred embodiments, the data processing system 20 resolves the relationships between data items and provides the related data items, represented as sectors, to the display 26 (via the method of the present invention). The data processing system 20 also dynamically generates further related data items so that when a user selects a sector further related data items can be displayed on the display 26 in accordance with at least FIGS. 2 through 11. Additionally, the data processing system 20 of the present invention initiates the steps of displaying a focus and redisplaying a new focus, represented as a selected sector, as well as redisplaying data items that relate to the new focus and redisplayed data items, as described below with reference to FIGS. 2 through 11.

Figure 1A:
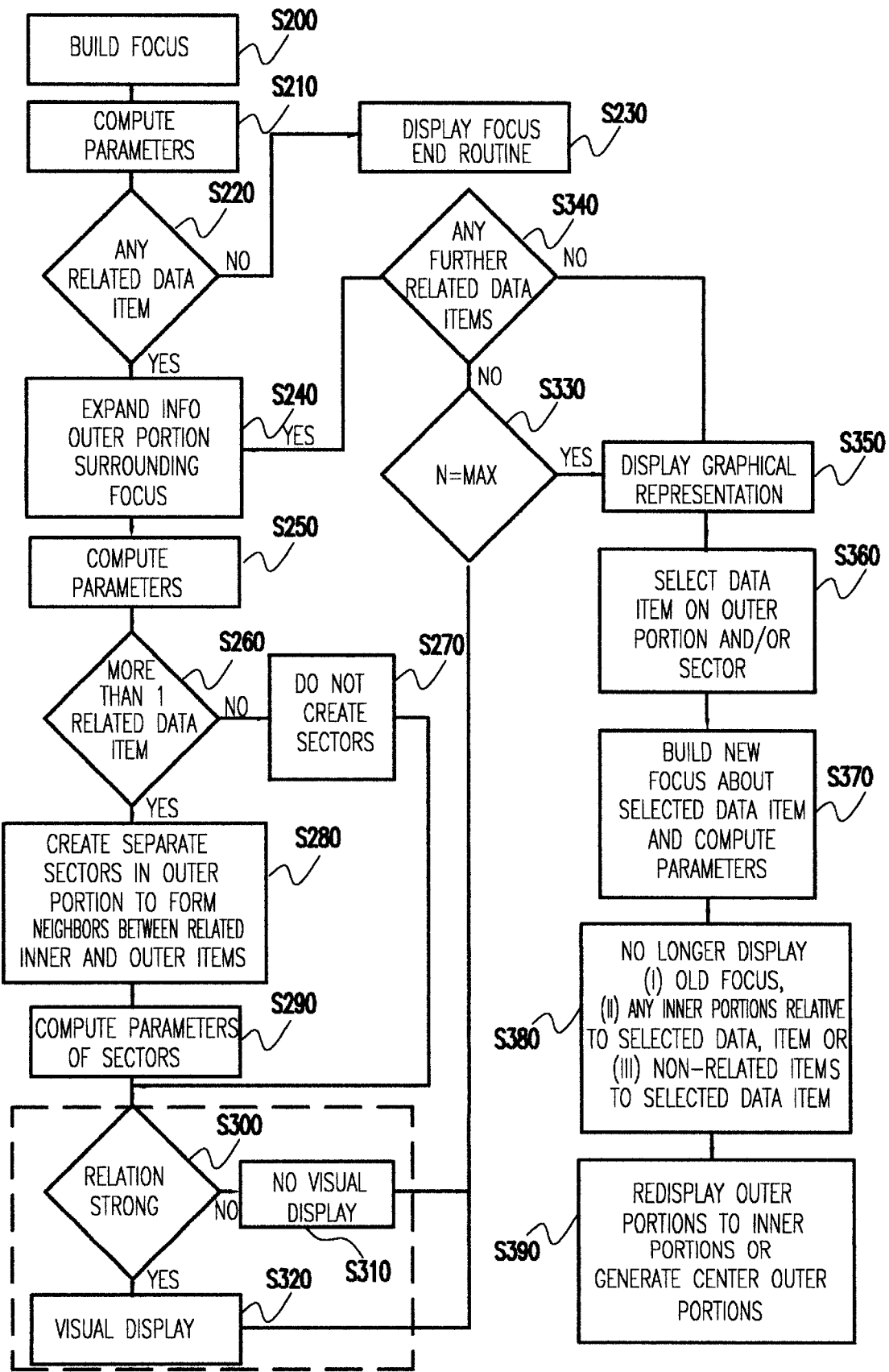
FIG. 1a is a flow diagram of a graphical representation of data items generated by the data processing system 20 in accordance with an embodiment of the present invention.

More particularly, FIG. 1*a* is a flow diagram of a graphical representation of data items generated by the data processing system 20 in accordance with an embodiment of the present invention. At step S200, the data processing system 20 defines a data item and builds a focus center about the data item. At step S210, the parameters of the focus are constructed, for example, if the focus is a circle, the center point and the radius are computed. At step S220, the data processing system 20 decides whether any data items relate to the focus as constructed in step S200. If no related data items exist, at step S230, the data processing system 20 displays the focus and ends the routine. If the data processing system 20 determines that there are further related data items at step S220, at step S240, the related data items are expanded into an outer portion. At step S250, the parameters of the outer portion are constructed, for example, the radius of an outer circle is constructed.

At step S260, the data processing system 20 determines whether there are more than one related data item in the outer portion. If there are more than one related data item in the outer portion, at step S260, the data processing system 20 creates sectors in the outer portion which are defined as neighbors between inner and outer related data items. If there are no related data items in the outer portion, at step S270, no sectors are created. If sectors are created, at step S290, parameters of the sectors are constructed.

In embodiments, the relationships between the related data items are determined at step S300. At step S320, a visual or audio display indicating a strong relationship between the inner and outer data items (e.g., neighbors) is generated. If the relationship between the related data items is determined to be weak, at step S310, no visual or audio display is generated. However, the above examples are for illustrative purposes only and are not to be construed as limiting factors. For example, a strong relationship may be determined by not generating a visual or audio display, while a weak relationship between inner and outer neighbors may be indicated by generating the visual or audio display. Also, the determination of a strong and weak relationship is not critical to understanding of the present invention.

At step S330, a maximum number of outer portions is determined. At step S340, the data processing system 20 determines whether there are any further related data items if the maximum number of outer portions has not been reached. If there are further related data items, the system of the present invention returns to step S240. At step S350, the graphical representation of the data items is displayed if the data processing system 20 determines that there are no further related items at step S340 or that the maximum number of outer portions has been reached at step S330. At step S360, a user may select a data item on an outer portion and/or sector. At step S370, the data processing system 20 builds a new focus for the selected data item of step S360 and constructs the parameters of the new focus. At step S380, the data processing system 20 no longer represents (i) the focus created in step S200, (ii) all inner portions relative to the selected data item and (iii) all non related items of the selected data item. In embodiments, steps S370 and S380 are interchangeable or can be performed simultaneously. In still further embodiments, at step S390, outer portions are redisplayed as inner more outer regions and further portions and/or sectors may be generated. The data processing system 20 can also again begin the routine of the present invention.

Figure 2:
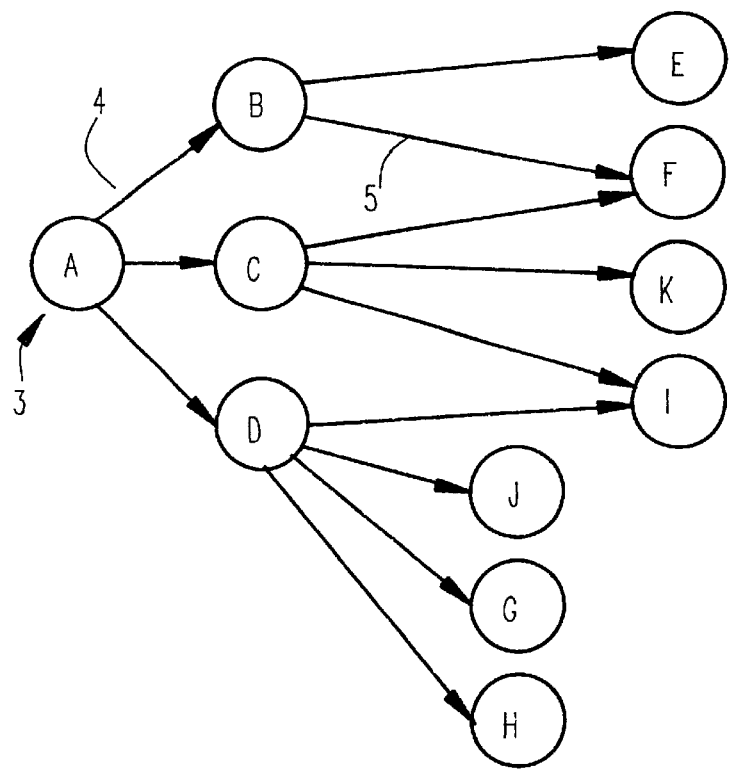
FIG. 2 is an underlying representation of the nodes of FIG. 1.

FIG. 2 is an underlying representation of data items, represented as nodes and arcs of the present invention. For illustrative purposes only, the nodes are represented by letters and the arcs are represented by lines having arrows. However, the nodes may be equally represented by alphanumericals or other depictions, such as, for example, colors or graphical images. Additionally, the letters, alphanumericals or other depictions of the present invention may represent various different data items such as images, audio sounds and the like.

Referring again to FIG. 2, each circled letter refers to graph information depicted as a node 3. Each arrow line connecting the nodes 3 are arcs 4 which define a relationship between the nodes 3. For example, node "A" is related to nodes "B", "C", and "D". Further, node "B" is related to nodes "E" and "F" and node "C" is related to nodes "F", "K"

and "I". As seen node "F" is related to both nodes "B" and "C". In the example of FIG. 2, the nodes may represent cities and the arcs 4 may represent roads that connect the cities. As previously discussed, the arcs 4 may also represent qualitative measures, such as, for example, the miles between the different connected cities. As still a further example of FIG. 2, the nodes 3 may represent audio data, such as, for example, harmonic chords.

Figure 3:
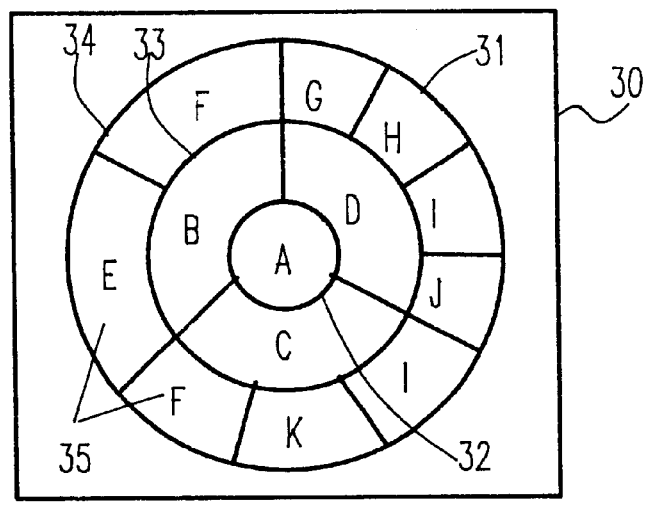
FIG. 3 is a graph navigation window of the present invention.

FIG. 3 shows a graph navigation window generated by the data processing system 20 using the data of FIG. 2. In this embodiment, the graph navigation window 30 is utilized to navigate specific data items as depicted in FIG. 2. In the graph of FIG. 3 a set of concentric circles 31 are provided. The center or focus 32 of the set of concentric circles 31 is node "A". Surrounding node "A" are successive nested concentric circles 33, 34, each partitioned into sectors 35. In preferred embodiments, the focus 32 represents a current position of the user and the adjacent nested concentric outer circle 33 and respective sectors 35 are related data items to the focus 32. Similarly, successive outer sector 34 and respective sectors are related to the immediately adjacent inner nested concentric circle 33 and its respective sectors 35. In preferred embodiments, the relationship between the nodes may be weak or strong and may be represented by various colored sectors or other visual or audio displays depicting the relative relational strengths of the nodes.

Each sector 35 is a node and relates to the nodes 3 of FIG. 2. For example, the first successive nested concentric circle 33 is divided into sectors 35 having related nodes "B", "C" and "D". The second nested concentric circle 34 is partitioned into sectors 35 having related nodes "E", "F", "G ", "I", "J" and "K". More particularly, referring to both FIGS. 2 and 3, node "A" is related to nodes "B", "C", and "D". Further, node "B" is related to nodes "E" and "F" and node "C" is related to nodes "F", "K" and "I". As seen node "F" is related to both nodes "B" and "C", which is depicted in both FIG. 2 and FIG. 3.

Thus, the partitioned sectors 35 of FIG. 3, are arranged so that any two sectors 35, which are adjacent between two successive nested concentric circles 33, 34, or between a nested concentric circle 33 and the focus 32, represent two nodes in the graph connected by an arc, as depicted in FIG. 2. For example, arc 5 of FIG. 2 connects nodes "F" and "B", while in FIG. 3, inner node "B" and outer related node "F" are connected via adjacent inner and outer sectors 35.

Figure 4:
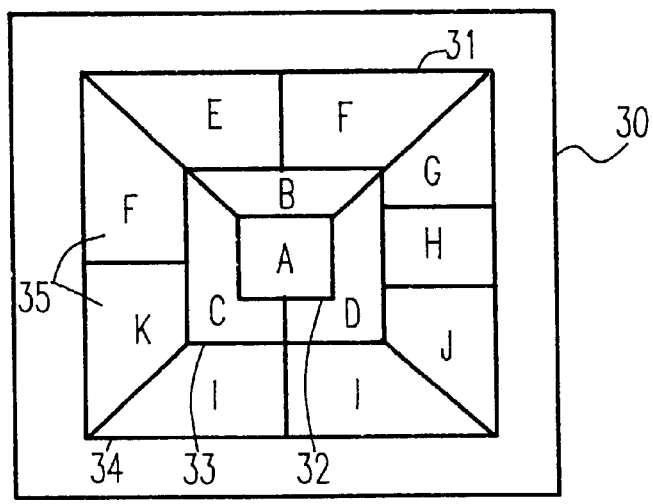
FIG. 4 is another graph navigation window of the present invention.

FIG. 4 is another graph navigation window generated by the data processing system 20 of the present invention. FIG. 4 shows the same graphical data as FIG. 3, but the data is represented in a successive square format, instead of using nested concentric circles. All other aspects of FIG. 4 are the same as to that of FIG. 3. Accordingly, the present invention is not limited to the use of nested concentric circles, but may utilize other geometric shapes, such as, for example, a square, a circle, etc. Further, as previously described, the present invention is not limited to the use of letters, but may equally utilize numbers or other depictions, such as, for example, images, colors, etc. when depicting the nodes of the present invention.

Figure 5:
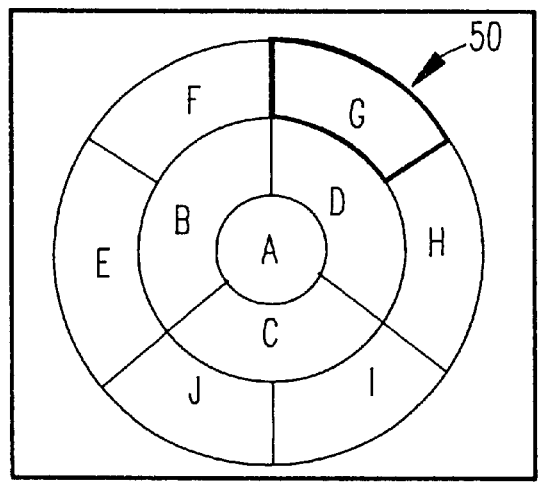
FIG. 5 is graph navigation window of the present invention showing a selection of a data item.

FIG. 5 is graph navigation window of the present invention showing a selection of a data item or node. In embodiments, a user action via, for example, the user data entry device 28, pointing device 29 or voice activation device, selects a sector 60 (e.g., node "G"). The selected sector 60 may then be visually indicated by either highlighting the selected sector 60 or some other well known visual display, such as, for example, flashing or blinking of the selected sector, special coloration of the selected sector, darkened borders of the selected sector, or by any other reasonable presentation techniques which renders the selected sector distinctive.

Figure 6:
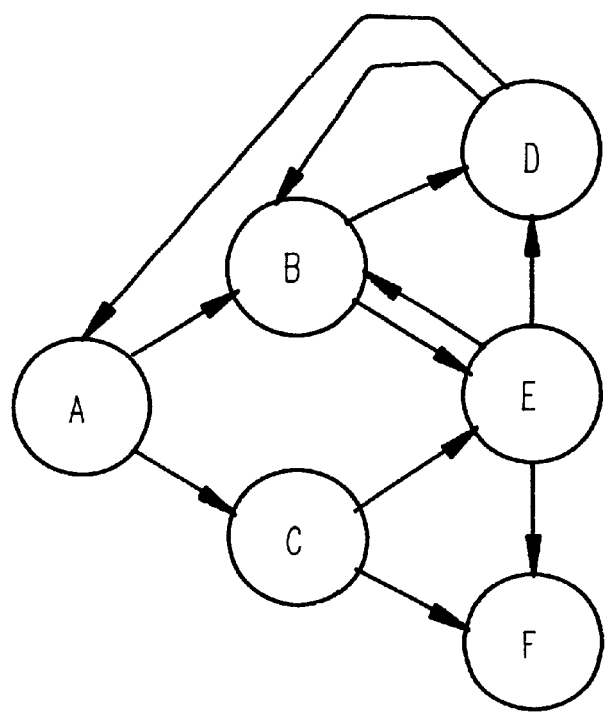
FIG. 6 is an underlying representation of data items used in the present invention.
Figure 7:
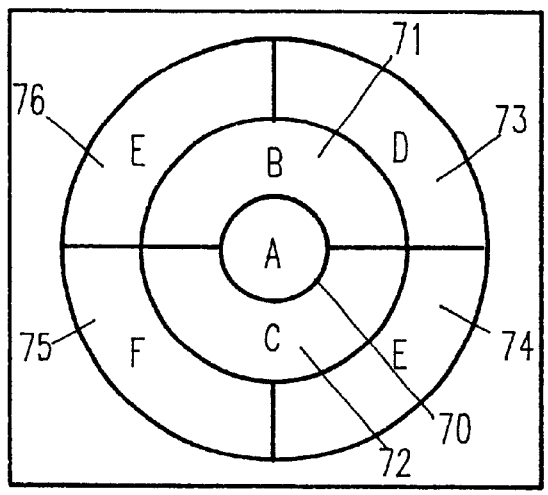
FIG. 7 is a further graph navigation window of the present invention using the data items of FIG. 6.
Figure 8:
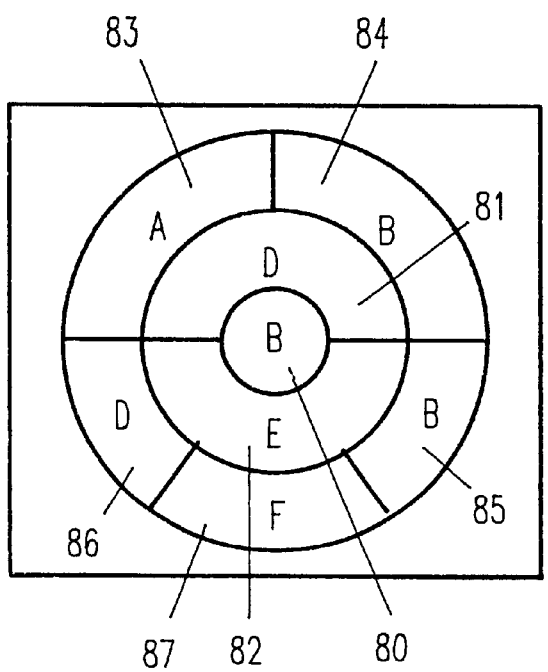
FIG. 8 is a graph navigation window of the present invention having a new focus point using the data items of FIG. 6.

Referring now to FIGS. 6–8, a further example of the present invention will be discussed. Referring to FIG. 6, an underlying representation of data items is shown. Specifically, FIG. 6 shows related nodes connected by several arcs. For example, node "A" is related to nodes "B" and "C". In turn, node "B" is related to nodes "D" and "E" and node "C" is related to nodes "E" and "F". Moreover, node "D" is related to nodes "A" and "B" and node "E" is related to nodes "B", "D" and "F".

FIGS. 7 and 8 show the relationship between the nodes (data items) of FIG. 6 via a graphical representation generated by the data processing system 20 of the present invention, similar to that shown in FIG. 3. FIGS. 7 and 8 may also graphically represent the nodes or data items using other geometric shapes and alphanumerical (or other depictions), as discussed above.

In particular, FIG. 7 is a graph navigation window of the present invention showing the same relations between the nodes of FIG. 6. For example, node "A" is related to nodes "B" and "C", and, in turn, node "B" is related to nodes "D" and "E" and node "C" is related to nodes "E" and "F". The nodes of FIG. 7 are partitioned into sectors 70–76.

After a user selects a particular node, for example, sector 71 (e.g., node "B"), the node "B" regenerates to become the new focus (or center) of the graph and the successive outer sectors 73, 76 (e.g., nodes "D" and "E", respectively) related to the new focus are redisplayed to inner sectors of the graph. Also, nodes that are related to the new inner sectors 73, 76, but which were not previously shown on the graph, may be generated by the method and apparatus of the present invention. In preferred embodiments, these new nodes will be assigned to outer sectors of the graph generated by the present invention and will relate to the most adjacent inner sectors of the graph.

Referring now to FIG. 8, a graph navigation window of the present invention having a new focus point is shown. In particular, after the user selects sector 71 of FIG. 7, the node "B" of sector 71 becomes the new focus 80. The sectors 73, 76 (e.g., nodes "D" and "E", respectively) of FIG. 7 are redisplayed to inner sectors 81, 82 of FIG. 8. Also, the nodes that are related to the new inner sectors 81, 82, shown in FIG. 6 as nodes "A", "B" and "B", "D", "F", are generated by the method and apparatus of the present invention as sectors 83, 84 and 85, 86, 87, respectively. In preferred embodiments, these new sectors 83–87 are assigned to outer portions of the graph.

Referring again to FIG. 7, the non selected node "C" (sector 72) of the same level of the selected node "B" (sector 71) and the nodes "E" and "F" (sectors 74, 75) related to the non selected node "C" are no longer graphically represented by the method and apparatus of the present invention when the new outer sectors 83–87 are generated and/or redisplayed in FIG. 8.

Thus, according to the preferred embodiment of the present invention, once a user selects any node of the present invention, that node regenerates as the new focus point. All related nodes are then redisplayed to adjacent sectors and any nodes that were not previously shown, but are related to the new inner sectors, are generated as immediate outer adjacent sectors. In this manner, many levels of the graph may be displayed in an organized manner so that the user can easily navigate through the data items of the present invention.

Examples of Use

The present invention may be used to represent any set of data items. For example, graphical representations of harmonic chords (e.g., audio data) having a known relationship may be generated by the method and apparatus of the present invention. Also, graphical representations of computer networks or other computer related data items, such as word processing menus, may also be represented by the method and apparatus of the present invention. It is noted, however, that these examples are for illustrative purposes only and are not to be considered limiting factors of the present invention.

Figure 9:
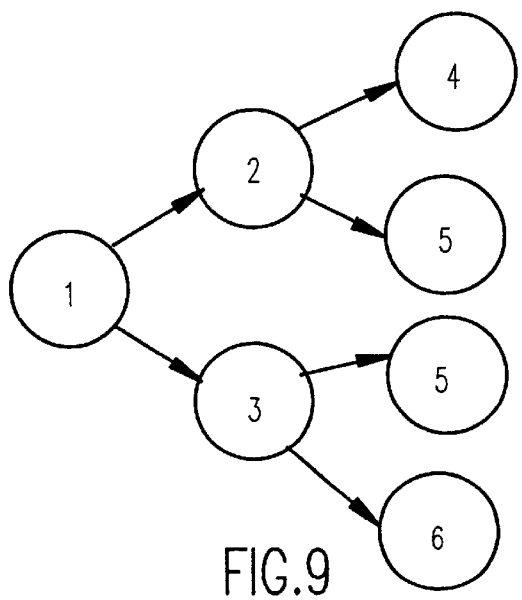
FIG. 9 is an example of an underlying representation of related harmonic chords.
Figure 10:
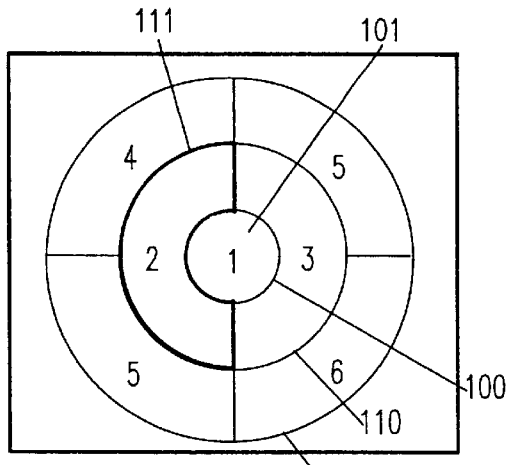
FIG. 10 is a graph navigation window of the present invention using the data items of FIG. 9.
Figure 11:
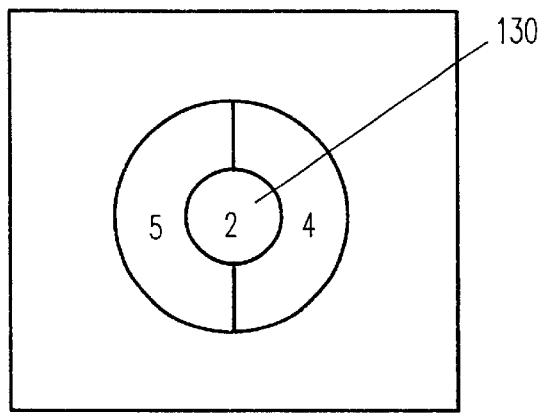
FIG. 11 is a graph navigation window of the present invention having a new focus point using the data items of FIG. 10.

FIGS. 9–11 show such an example of a graphical representation of harmonic chords (e.g., data items) using the method and apparatus of the present invention. FIGS. 9–11 are represented in numerical format for illustrative purposes only.

FIG. 9 shows the underlying representation of the harmonic chords, where chord "1" is related to chord "2" and chord "3". Chord "2" is related to chord "4" and chord "5" and chord "3" is related to chord "5" and chord "6". The apparatus of the present invention, in preferred embodiments, may dynamically generate further relationships of the harmonic chords. of course, the nature of the graphical representation may also be static in certain embodiments.

FIG. 10 shows the harmonic chords of FIG. 9 in a graphical representation created by the apparatus of the present invention. FIG. 10 shows three nested outer portions, 100, 110, 120 partitioned into several sectors. Node "1" is depicted as focus 101 and node "2" is depicted as selected node 111.

FIG. 11 shows the selected node 101 as the new focus 130, and the nodes "4" and "5" being redisplayed to inner sectors. Although not shown in FIG. 11, the method and apparatus of the present invention may generate new nodes or data items related to the nodes "4" and "5" and assign those new nodes to successive outer sectors of the graphical representation of the data items of the present invention.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for navigating a graph of data items in a graphical format on a visual display comprising the steps of:
   representing a first current data item in a central portion of said visual display; and
   representing at least one additional data item related to the first current data item in an outer portion of said visual display surrounding the central portion of the visual display, where the outer portion shows optional paths for navigating the graph from the first current data item;
   selecting the outer portion, wherein the first outer portion represents only one additional data item;
   displaying the selected outer portion as a new central portion, the one additional data item represented by the selected outer portion being a new first current data item represented by the new central portion.

2. The method of claim 1, wherein the central portion and the outer portion are represented by indicia selected from the group consisting of alphanumerics, symbols, colors, graphical images and audio information.

3. The method of claim 1, further comprising the step of providing one of a visual and an audio display indicating the selection of the outer portion.

4. The method of claim 1 further comprising the step of representing at least one additional data item related to the new first current data item in a new outer portion surrounding the new central portion of the visual display, where the new outer portion shows optional paths for navigating the graph from the new first current data item.

5. The method of claim 4, further comprising the step of displaying the new central portion and the new outer portion surrounding the new central portion in a nested geometric shape on a display.

6. The method of claim 4, further comprising the step of partitioning the new outer portion surrounding the new central portion into new outer portion sectors, if the new outer portion represents more than one data item, each new outer portion sector being associated with a corresponding data item represented by the new outer portion.

7. The method of claim 1, wherein the central portion and the outer portion reflect graph arc relationships between the first current data item and the at least one additional data item represented by the outer portion and the graph arc relationships represent qualitative measure between the first current data item and the at least one additional data item represented by the outer portion.

8. A method as recited in claim 1, wherein the first current data item is also represented by the outer portion as one of the at least one additional data item, thereby forming a representation of a cyclical graph.

9. A method for navigating a graph of data items in a graphical format on a visual display, comprising the steps of:
   representing a first current data item in a central portion of said visual display; and
   representing at least one additional data item related to the first current data item in an outer portion of said visual display surrounding the central portion of the visual display, where the outer portion shows optional paths for navigating the graph from the first current data item;
   representing successive data items related to the at least one additional data item in successive outer portions surrounding the central portion of the visual display,
   where the successive outer portions show additional optional paths for navigating the graph from a data item represented in an outer portion,
   wherein a data item represented in a first successive outer portion is related to the first current data item,
   wherein a data item represented in a second successive outer portion is related to at least one data item represented in the first successive outer portion, and
   wherein each data item represented in further successive outer portions is related to at least one data item represented in an immediate adjacent inner successive outer portion;
   partitioning each of the successive outer portions into successive outer sectors if a successive outer portion represents more than one data item, but if the successive outer portion represents only one data item, then the partitioned successive outer sector being equivalent to the successive outer portion, wherein each of the successive outer sectors is associated with a corresponding data item represented by the successive outer portions;
   selecting one of the successive outer sectors;
   displaying the selected successive outer sector as a new central portion, wherein the new central portion represents a new first current data item;

representing successive data items related to the new first current data item in new successive outer portions surrounding the new central portion of the visual display, where the new successive outer portions show additional optional paths for navigating the graph from a data item represented in a new successive outer portion, wherein a data item represented in a first new successive outer portion is related to the new first current data item, wherein a data item represented in a second successive outer portion is related to at least one data item represented in the new first successive outer portion, and wherein data items represented in further new successive outer portions are related to at least one data item represented in an immediate adjacent inner new successive outer portion;

redisplaying the new successive outer portions surrounding the new central portion;

partitioning each of the redisplayed new successive outer portions into new successive sectors if a redisplayed new successive outer portion represents more than one data item, but the redisplayed new successive outer portion represents only one data item, then the partitioned new successive outer sectors being equivalent to the new successive outer portions, wherein each of the new successive outer sectors is associated with a corresponding data item represented by the new successive outer portions;

redisplaying the new successive outer sectors of the redisplayed new successive outer portions.

10. A method for navigating a graph of data items in a graphical format on a visual display, comprising the steps of:

representing a first current data item in a central portion of said visual display; and representing at least one additional data item related to the first current data item in an outer portion of said visual display surrounding the central portion of the visual display, where the outer portion shows optional paths for navigating the graph from the first current data item;

partitioning the outer portion surrounding the central portion into outer sectors, if the outer portion representing more than one data item, and if the outer portion represents only one data item, then the partitioned outer sector being equivalent to the outer portion, wherein each outer sector is associated with a corresponding data item represented by the outer portion;

selecting an outer sector of the outer portion the corresponding data item of the selected outer sector being a new first current data item in a new central portion of the visual display; and representing at least one additional data item related to the corresponding data item of the selected outer sector in a new outer portion of the visual display surrounding the new central portion, wherein data items represented by the central portion, the outer portion and the new outer portion are related harmonic chords.

11. The method of claim 10, wherein each of the outer sectors represent one of a strong relation and a weak relation between related data items represented by the central portion and the outer sectors.

12. The method of claim 10, further comprising the step of providing one of a visual and an audio display indicating the selection of the outer sector.

13. A data processing system for navigating a graph of data items in a graphical format on a display, comprising:

central portion means for displaying a central portion representing a first current data item; and outer portion surrounding means for displaying at least one outer portion surrounding the central portion of the visual display, a first outer portion representing at least one data item related to the first current data item, and successive outer portions representing at least one data item related to at least one data item represented by an inner adjacent outer portion, the central portion and the at least one surrounding outer portion forming an outwardly nested geometrical shape, wherein each of the at least one outer portion shows optional paths for navigating the graph from the first current portion;

selecting means for selecting the at least one outer portion relating to the central portion;

selective displaying means for no longer displaying the central portion in response to the selecting means selecting the at least one outer portion; and redisplaying means for redisplaying the selected at least one outer portion as a new central portion representing a new first current data item in response to the selecting means selecting the at least one outer portion.

14. The data processing system of claim 13, wherein the nested geometrical shape is one of outward nested concentric circles and outward nested squares.

15. The data processing system of claim 13, wherein the data items represented by the central portion and the at least one surrounding outer portion are represented by indicia selected from the group consisting of letters, numerals, alphanumerics, visual images, colors and audio sounds.

16. The data processing system of claim 13, wherein the selecting means includes a mouse, a track ball or a voice activation device.

17. The data processing system of claim 13, wherein selectively displaying the selected portion includes at least highlighting, coloring, darkening borders, audio sounds and blinking the selected portion.

18. The data processing system of claim 13, further comprising:

generating means for generating a new outer portion surrounding the new central portion in response to the redisplaying means redisplaying the new central portion, the new outer portion representing at least one data item related to the new first current data item.

19. The data processing system of claim 18, wherein the selective displaying means in response to the selecting means selecting the at least one outer portion no longer displays:

the central portion;

inner more outer sectors with respect to the selected successive outer sector;

non selected outer sectors of a same level of the selected successive outer sector; and outer sectors related to the non selected successive outer sectors.

20. The data processing system of claim 13, wherein the redisplaying means further redisplays the at least one outer portion as inner more portions positioned at an outer portion with respect to the new central portion in response to the redisplaying means redisplaying the new central portion.

21. A method of indicating to a user a current portion or portions of graph information within a presentation space, wherein the graph information comprises data items and relationships among the data items, the data items being graph nodes and the relationships among the data items being graph arcs between corresponding nodes, said method comprising the steps of:

displaying a central portion representing a first a current data item of the information graph data;

displaying at least one concentric nested shape surrounding the central portion, the at least one concentric nested shape partitioned into sectors where each sector reflects an arc relationship of the information graph data, wherein the at least one concentric nested shape surrounding the central portion shows optional paths for navigating the graph from the first current data item;

displaying within each sector at least one indicia for indicating a graph node of interest;

selecting a graph node; and rendering and displaying a new central portion identified with the selected graph node representing a new first current data item.

22. A method as recited in claim 21, further comprising the steps of:

displaying new at least one concentric nested shape surrounding the new central portion, the new at least one concentric nested shape partitioned into new sectors where each new sector reflects an arc relationship of the information graph data, wherein the new at least one concentric nested shape surrounding the new central portion shows optional paths for navigating the graph from the new first current data item; and displaying within each new sector at least one indicia for indicating a graph node of interest.

23. A method for navigating a graph of data items in a graphical format on a visual display, comprising the steps of:

representing a first current data item in a central portion of said visual display; and representing at least one additional data item related to the first current data item in an outer portion of said visual display surrounding the central portion of the visual display, where the outer portion shows optional paths for navigating the graph from the first current data item;

partitioning the outer portion surrounding the central portion into outer sectors, if the outer portion represents more than one data item, and if the outer portion represents only one data item, then the partitioned outer sector being equivalent to the outer portion, wherein each outer sector is associated with a corresponding data item represented by the outer portion;

selecting an outer sector of the outer portion; and displaying the selected outer sector as a new central portion, wherein the corresponding data item associated with the selected outer sector is a new first current data item.

24. A method for navigating a graph of data items in a graphical format on a visual display, comprising the steps of:

representing a first current data item in a central portion of said visual display; and representing at least one additional data item related to the first current data item in an outer portion of said visual display surrounding the central portion of the visual display, where the outer portion shows optional paths for navigating the graph from the first current data item;

representing successive data items related to the at least one additional data item in successive outer portions surrounding the central portion of the visual display, where the successive outer portions show additional optional paths for navigating the graph from a data item represented in an outer portion, wherein a data item represented in a first successive outer portion is related to the first current data item, wherein a data item represented in a second successive outer portion is related to at least one data item represented in the first successive outer portion, and wherein data items represented in further successive outer portions are related to at least one data item represented in an immediate adjacent inner successive outer portion;

partitioning each of the successive outer portions into successive outer sectors if a successive outer portion represents more than one data item, but if the successive outer portion represents only one data item, then the partitioned successive outer sector being equivalent to the successive outer portion, wherein each successive outer sector is associated with a corresponding data item represented by the successive outer portion;

selecting an outer sector of one of the successive outer portions; and displaying the selected outer sector as a new central portion, wherein the corresponding data item associated with the selected outer sector becomes a new first current data item.

25. The method of claim 24, further comprising the step of providing one of a visual and an audio display indicating the selection of the outer sector.

26. A method as recited in claim 24, further comprising the step of:

representing new successive data items related to the new first current data item in new successive outer portions surrounding the new central portion of the visual display, where the new successive outer portions show additional optional paths for navigating the graph from a data item represented in an outer portion, wherein a data item represented in a first new successive outer portion is related to the first current data item, wherein a data item represented in a second new successive outer portion is related to at least one data item represented in the first new successive outer portion, and wherein data items represented in further new successive outer portions are related to at least one data item represented in an immediate adjacent inner new successive outer portion.

27. The method of claims 26, further comprising the step of:

partitioning each of the new successive outer portions into new successive outer sectors, if the each of the new successive outer portions represents more than one data item, and if the each of the new successive outer portions represents only one data item, then the partitioned new successive outer sector being equivalent to the new successive outer portion, wherein each new successive outer sector is associated with a corresponding data item represented by the new successive outer portion.

28. A method as recited in claim 24, wherein the first current data item is also represented by a successive outer portion as one of the at least one additional data item, thereby forming a representation of a cyclical graph.

29. A method as recited in claim 24, wherein a data item represented by one of the successive outer portions is also represented by another of the successive outer portions as one of the at least one additional data item, thereby forming a representation of a cyclical graph.

* * * * *